No. 695,480. Patented Mar. 18, 1902.
G. NORDSTROM.
PIPE MACHINE.
(Application filed June 24, 1901.)
(No Model.) 2 Sheets—Sheet 1.
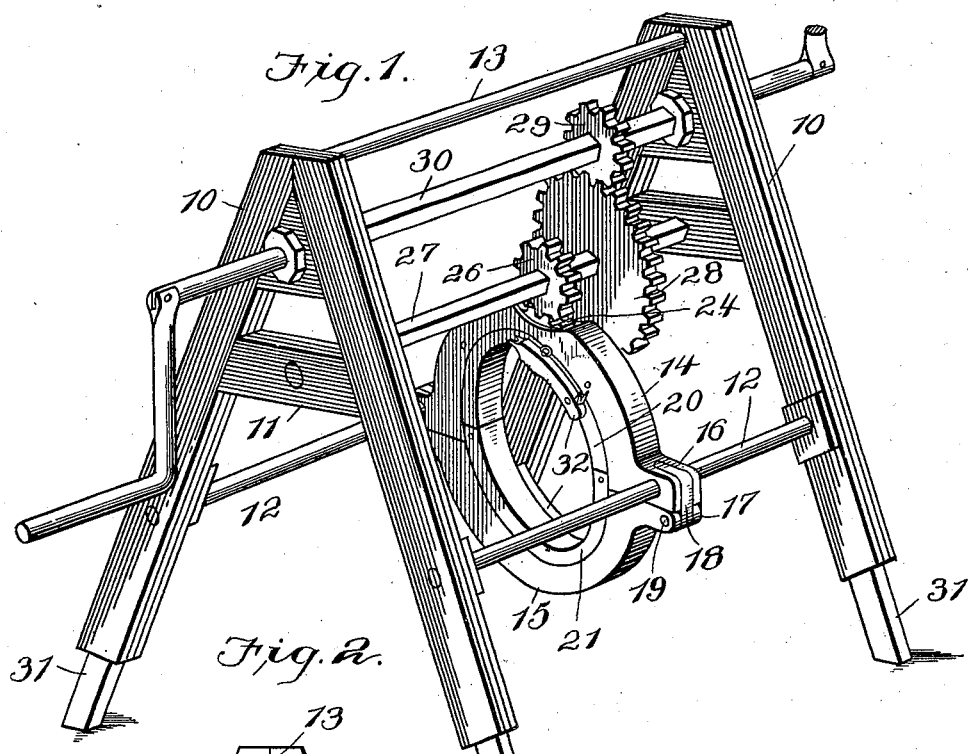
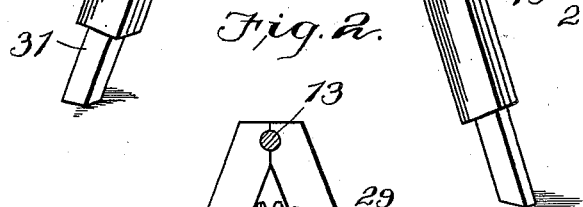
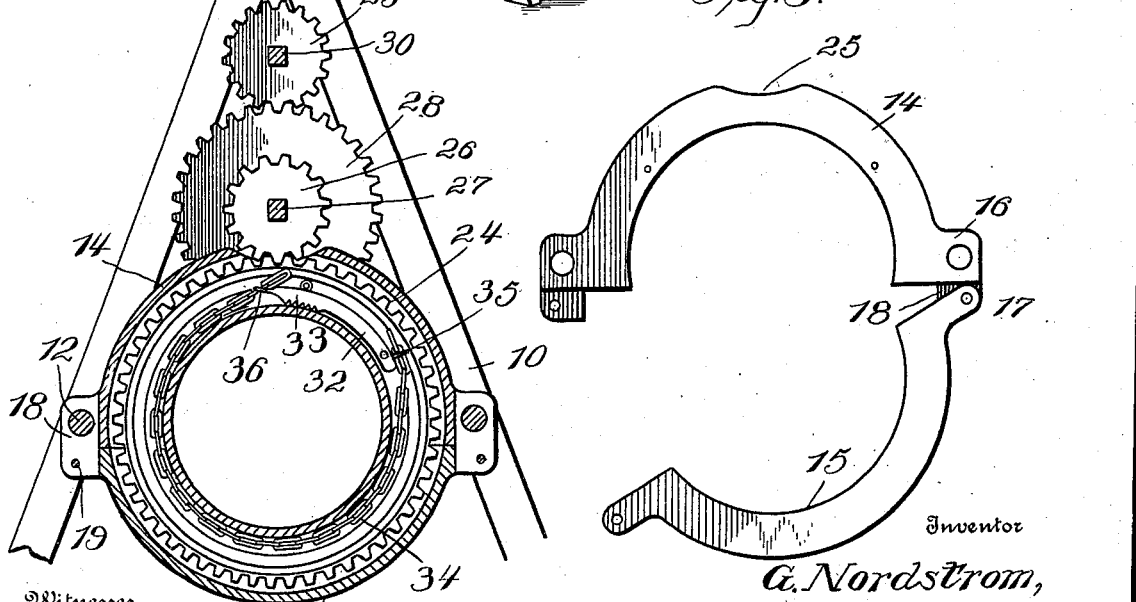
Witnesses
T. P. Britt
Harry Ellis Chandlee
Inventor
G. Nordstrom,
By 
Attorneys No. 695,480. Patented Mar. 18, 1902.
G. NORDSTROM.
PIPE MACHINE.
(Application filed June 24, 1901.)
(No Model.) 2 Sheets—Sheet 2.

Witnesses
J. P. Britt
Harry Ellis Chandler

Inventor
G. Nordstrom,
By Chandler & Chandler
Attorneys

UNITED STATES PATENT OFFICE.

GERHART NORDSTROM, OF KEARSARGE, MICHIGAN.

PIPE-MACHINE.

SPECIFICATION forming part of Letters Patent No. 695,480, dated March 18, 1902.

Application filed June 24, 1901. Serial No. 65,896. (No model.)

*To all whom it may concern:*

Be it known that I, GERHART NORDSTROM, a citizen of the United States, residing at Kearsarge, in the county of Houghton, State of Michigan, have invented certain new and useful Improvements in Pipe-Machines; and I do hereby declare the following to be a full, clear, and exact description of the invention, such as will enable others skilled in the art to which it appertains to make and use the same.

This invention relates to machines for threading and connecting pipes, and particularly for use in connection with pipes of large size; and the object of the invention is to provide a construction which may be adjusted for use in cutting threads upon a pipe and in which the parts may be then adjusted and equipped for screwing sections of pipe either one into the other or both into a coupling.

A further object of the invention is to provide a machine which may be connected with a pipe in a trench and which will engage it securely to insure efficient operation.

Figure 4:
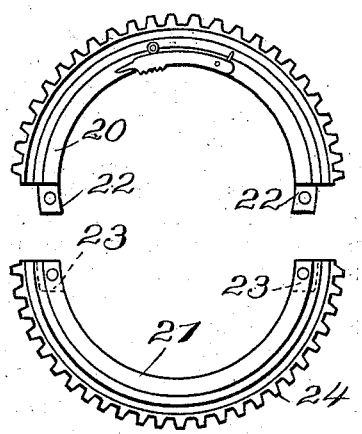
Figure 5:
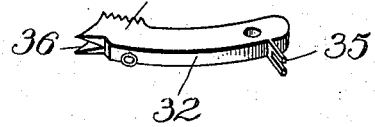
Figure 6:
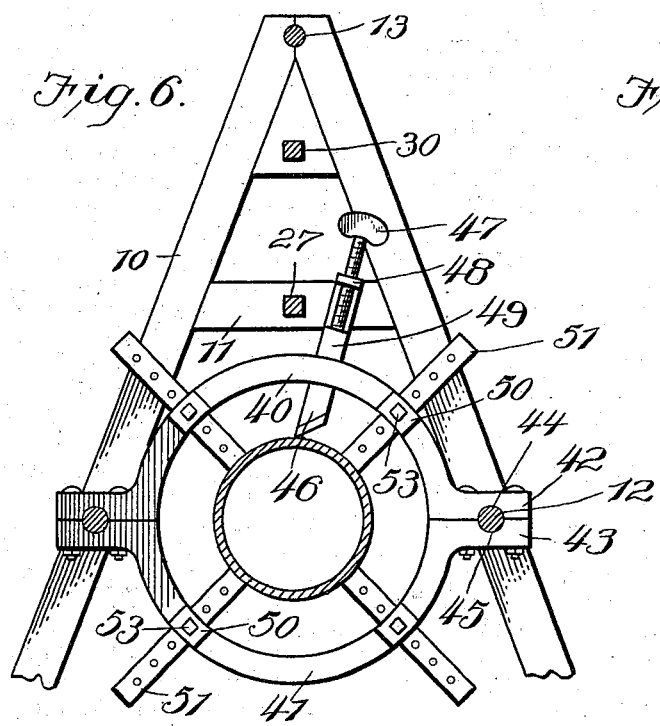
Figure 7:
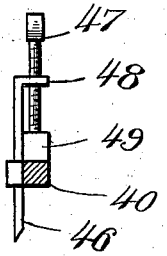

In the drawings forming a portion of this specification, and in which like numerals of reference indicate similar parts in the several views, Figure 1 is a perspective view showing the machine adjusted and equipped for screwing one pipe into another or into a socket. Fig. 2 is a transverse section through the machine and including the split collar, the clutch-carrying-gear sections being shown in elevation and a pipe with which they are engaged being shown in sections. Fig. 3 is a detailed elevation showing the split collar opened up. Fig. 4 is an elevation showing the clutch-carrying gear with the sections thereof disjointed. Fig. 5 is a detail view showing one of the clutching-jaws. Fig. 6 is a transverse section through the machine, showing the pipe cutting and threading tools. Fig. 7 is a transverse section through a member of the carrier and showing the cutting-tool and the means for adjusting it.

Referring now to the drawings, the present machine comprises a frame consisting of upwardly-converging beams 10, which are connected at their upper ends in pairs and are provided near their lower ends with transverse braces 11. Connecting the beams 10, the pairs of which are disposed parallel, are the lower tie-rods 12 and the upper tie-rod 13, each pair of beams thus forming an end of the frame that includes the tie-rods.

Mounted upon the tie-rods 12 is a carrier in the form of a split collar, including an upper member 14 and a lower member 15, the connected ends of the members having outwardly-directed lugs 16 and 17, and the lugs 16 are perforated, so as to permit of slidable engagement of the member 14 with the tie-rods 12. The outer ends of the lugs 16 and 17 are slotted, and in the slots of the lugs 16 are pivoted links 18, which are adapted to be swung into the slots of the lugs 17, in which position they are engaged by coupling-pins 19, which are passed through alining perforations in the lugs 17 and the lower ends of the links. These links and coupling-pins hold the members 14 and 15 firmly together and at the same time permit of ready removal of the lower member to permit of application of the pipe-clutching mechanism.

The pipe-clutching mechanism referred to consists of a split ring comprising the sections 20 and 21, provided with couplings including heads 22 and sockets 23 at their ends, and to connect the sections of the ring the heads are engaged with the sockets and are held in position by means of coupling-pins. This split ring is provided with gear-teeth 24 on its outer periphery, and it is disposed in the annular groove formed in the split sleeve forming the carrier of the machine. At the uppermost point of the member 14 of the carrier is a recess 25, which opens into the groove in the inner face of the carrier, so that the teeth of the split ring may project or be exposed for engagement by a pinion 26, mounted upon a shaft 27, journaled in the frame. The shaft 27 carries also a gear 28, with which is engaged a pinion 29 on a shaft 30, which is journaled in the frame and is provided with cranks, so that when the cranks are operated the split ring will be rotated in the carrier.

A pipe to be operated upon has the frame placed over it, the beams 10 being provided with extension-legs 31, which permit of adjustment of the frame to hold the carrier at a proper height to receive the pipe. Previous to placing of the frame over the pipe one of the coupling-pins 19 is withdrawn and the carrier is swung open and the split ring is removed. The split ring is then disposed around the pipe and is engaged in the groove in the carrier, the lower member of the carrier being then swung up into place and coupled.

In order to hold the pipe to rotate with the split ring or clutch-ring, clutching-jaws are provided, and each consists of a finger 32, pivoted to the side face of one section of the ring and at the free end of which is a head 33, having a convex serrated face, the pivot of the finger being disposed inwardly from the ends thereof. The fingers are arcuate, as shown, with the concave faces inwardly of the ring, and attached to the outer face of each of the fingers is a section of chain 34, which is of sufficient length to pass entirely around the pipe. At one end or the butt-end of the fingers are the ears 35, between which the chain is first taken, after which it is taken around the pipe and is engaged between the ears 36 at the head end of the finger, the ears 36 being so spaced that they may engage between two of the links of the chain, and thus hold the chain taut. When the chain is thus placed under tension, it draws the teeth of the finger against the face of the pipe, and when the clutch-ring is then rotated the tension on the chain is increased and the teeth are drawn more tightly against the pipe. By then rotating the crank-shaft the clutch-ring is rotated, as above described, and the pipe is rotated to screw it into the socket disposed to receive it, whether it be the socket of a coupling or of a second section of pipe. If a section of pipe is to be unscrewed, the clutch-ring is reversed and engaged with the pipe in the same manner above described. When a pipe is to be cut, an additional attachment is employed and consists of a split ring including the members 40 and 41, having the outwardly-directed lugs 42 and 43 at their ends and provided with recesses 44 and 45, which when the lugs are brought together form bearings to receive the rods 12, the lugs being held together by bolts, as shown. This split ring is disposed to encircle the pipe to be cut, and slidably mounted upon one member thereof is a cutting-off tool 46, which is slidably mounted for movement into and out of the inclosure of the split ring through the medium of a set-screw 47, engaged with a post 49 on the member 40 and which is passed loosely through an opening in the shoulder 48 of the tool. After this split ring has been disposed around the pipe the cutting-tool is adjusted to engage the pipe, and the apparatus is then operated to rotate the pipe. By screwing up on the set-screw the tool is moved inwardly of the ring, so as to cut a deeper chip, and by continually adjusting this screw the tool is fed so as to finely cut entirely through the pipe, the pipe being rotated during the operation.

To provide for threading a pipe, guides 50 are formed upon the members 40 and 41 of the split ring, and these guides slidably receive the stocks or stems of dies 51, which are held in their adjusted positions by a set-screw 53. The dies are adjusted to properly engage the pipe, and the pipe is then rotated, the engagement of the split ring with the rods 12 being sufficiently loose to permit the split ring to feed in the direction of the carrier at a speed corresponding to the thread being cut.

It will thus be seen that with this construction a pipe may be cut off and then threaded and finally screwed into a socket by manipulation of the mechanism in the proper manner, thus overcoming the necessity for transporting the pipe should it be found desirable to cut off a portion and thread the remainder.

It will be understood that in practice modifications of the specific construction shown may be made and that any suitable materials and proportions may be used for the various parts without departing from the spirit of the invention.

What is claimed is—

1. A device of the class described comprising a supporting-frame, a carrier mounted upon the frame, a clutch-ring rotatably mounted in the carrier and having means for rotating it, and clutching-jaws carried by the ring for engagement with a pipe passed through the carrier.

2. A device of the class described comprising a supporting-frame, a carrier consisting of a split collar mounted upon the frame and having means for holding the sections of the collar together, said collar having an inner annular groove and an opening communicating with said groove, a split ring engaged with the groove and having teeth upon its outer periphery disposed to project through the opening in the sleeve, means carried by the ring for engagement with a pipe passed through the ring, and a crank-shaft having operative connection with the split ring, said connection including a gear disposed in the opening of the sleeve and engaged with the teeth therein.

3. A device of the class described comprising a supporting-frame, a split carrier mounted in the frame, said carrier having a groove in its inner face and a recess in its outer face communicating with the groove, a split ring disposed in the groove and having an exterior gear exposed through the recess, a gear engaged with the teeth in the recess, means for rotating the gear-and-clutch mechanism carried by the split ring for engagement with a pipe passed therethrough.

4. A machine of the class described comprising a frame a split collar mounted upon the frame and having a groove in its inner face, a split ring mounted in the groove and having teeth on its outer periphery, said collar having an opening through which the teeth are exposed, a train of gearing including a pinion engaged with the teeth, clutch-fingers pivoted upon the split ring and having spaced ears at their ends, and a chain attached to the outer face of each of the fingers and adapted to engage between the ears thereof, the fingers having heads at their ends provided with convex serrated inner faces for engagement with a pipe passed through the ring.

5. A machine of the class described comprising a frame including end pieces and tie-rods, a carrier mounted upon the tie-rods, and having an interior groove, a clutch-ring rotatably mounted in the groove and having clutch-fingers adapted for engagement with a pipe passed through the ring, said fingers having means for holding them in engaged positions, a second split ring slidably mounted upon the tie-rod and cutting and threading tools mounted upon the second split ring for movement interchangeably to engage a pipe passed through the ring.

In testimony whereof I hereunto sign my name, in the presence of two subscribing witnesses, on the 29th day of April, 1901.

GERHART NORDSTROM.

Witnesses:
J. CHATEL,
CHARLES JACKSON.